US010498388B1

(12) United States Patent
Tsai

(10) Patent No.: US 10,498,388 B1
(45) Date of Patent: *Dec. 3, 2019

(54) ELECTRONIC DEVICE AND NON-TRANSITORY COMPUTER READABLE STORAGE MEDIUM

(71) Applicant: HTC Corporation, Taoyuan (TW)

(72) Inventor: Yao-Te Tsai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,963

(22) Filed: Sep. 9, 2019

Related U.S. Application Data

(62) Division of application No. 16/034,368, filed on Jul. 13, 2018, now Pat. No. 10,454,522.

(60) Provisional application No. 62/532,378, filed on Jul. 14, 2017.

(51) Int. Cl.
*H04B 1/715* (2011.01)
*H04B 1/7156* (2011.01)

(52) U.S. Cl.
CPC ........... *H04B 1/715* (2013.01); *H04B 1/7156* (2013.01)

(58) Field of Classification Search
CPC ...... H04B 1/715; H04B 1/7156; H04B 1/713; H04W 76/19
USPC ................................. 375/133; 370/353, 280
See application file for complete search history.

(56) References Cited

U.S. PATENT DOCUMENTS

| | | | |
|---|---|---|---|
| 6,389,010 B1 * | 5/2002 | Kubler | G06F 1/1626 370/353 |
| 2006/0029018 A1 | 2/2006 | Mizukami et al. | |
| 2010/0202327 A1 * | 8/2010 | Mushkin | H04B 1/713 370/280 |

FOREIGN PATENT DOCUMENTS

| | | |
|---|---|---|
| CN | 101836402 B | 5/2013 |
| WO | 2006013310 A1 | 2/2006 |

OTHER PUBLICATIONS

Corresponding Taiwan office action dated Feb. 23, 2019.

* cited by examiner

*Primary Examiner* — Chieh M Fan
*Assistant Examiner* — Fitwi Y Hailegiorgis
(74) *Attorney, Agent, or Firm* — CKC & Partners Co., LLC

(57) ABSTRACT

An electronic device includes a processing circuit, a communicating circuit, a memory and programs that are stored in the memory and configured to be executed by the processing circuit. The programs include instructions for: controlling the communicating circuit to communicate with the target device within frequency channels respectively in time slots to perform the frequency hopping communication; in a communication recovery operation, controlling the communicating circuit to scan within the frequency channels respectively in recovery time slots, while the target device is operated and locked within a recovery frequency channel in the frequency channels; and controlling the communicating circuit to be operated and locked within the recovery frequency channel, while the target device scans within the frequency channels respectively in the recovery time slots, wherein the time slots have a first length, and the recovery time slots have a second length shorter than the first length.

11 Claims, 5 Drawing Sheets

ELECTRONIC DEVICE AND NON-TRANSITORY COMPUTER READABLE STORAGE MEDIUM

RELATED APPLICATIONS

This application is a divisional application of U.S. application Ser. No. 16/034,368, filed on Jul. 13, 2018, which claims priority to U.S. Provisional Application Ser. No. 62/532,378, filed on Jul. 14, 2017, the entirety of which is incorporated by reference herein.

BACKGROUND

Technical Field

The present disclosure relates to an electronic device and a frequency hopping communication system. More particularly, the present disclosure relates to a frequency hopping communication recovering method in the frequency hopping communication system.

Description of Related Art

Nowadays, frequency hopping methods are widely used in various wireless communications between two or more electronic devices. For example, frequency hopping methods are applied in Bluetooth technology to avoid causing interference to other devices.

SUMMARY

One aspect of the present disclosure is related to a frequency hopping communication recovering method. In accordance with some embodiments of the present disclosure, the frequency hopping communication recovering method includes: communicating a first device and a second device within multiple frequency channels respectively in multiple time slots to perform a frequency hopping communication; in a communication recovery operation, configuring the first device to be operated and locked within a recovery frequency channel in the frequency channels; and in the communication recovery operation, configuring the second device to scan within the frequency channels respectively in multiple recovery time slots. The time slots have a first length, and the recovery time slots have a second length shorter than the first length.

Another aspect of the present disclosure is related to an electronic device. In accordance with some embodiments of the present disclosure, the electronic device includes a processing circuit, a communicating circuit electrically connected to the processing circuit and configured to communicate the electronic device with a target device via a frequency hopping communication, a memory electrically connected to the processing circuit, and one or more programs. The one or more programs are stored in the memory and configured to be executed by the processing circuit. The one or more programs including instructions for: controlling the communicating circuit to communicate with the target device within multiple frequency channels respectively in multiple time slots to perform the frequency hopping communication; in a communication recovery operation, controlling the communicating circuit to scan within the frequency channels respectively in multiple recovery time slots, while the target device is operated and locked within a recovery frequency channel in the frequency channels; and in the communication recovery operation, controlling the communicating circuit to be operated and locked within the recovery frequency channel, while the target device is scanning within the frequency channels respectively in the recovery time slots. The time slots have a first length, and the recovery time slots have a second length shorter than the first length.

Another aspect of the present disclosure is related to a non-transitory computer readable storage medium. In accordance with some embodiments of the present disclosure, the non-transitory computer readable storage medium stores one or more programs including instructions, which when executed, causes a processing circuit to perform operations including: controlling a communicating circuit to communicate an electronic device with a target device within multiple frequency channels respectively in multiple time slots to perform a frequency hopping communication; in a communication recovery operation, controlling the communicating circuit to scan within the frequency channels respectively in multiple recovery time slots, while the target device is operated and locked within a recovery frequency channel in the frequency channels; and in the communication recovery operation, controlling the communicating circuit to be operated and locked within the recovery frequency channel, while the target device is scanning within the frequency channels respectively in the recovery time slots. The time slots have a first length, and the recovery time slots have a second length shorter than the first length.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
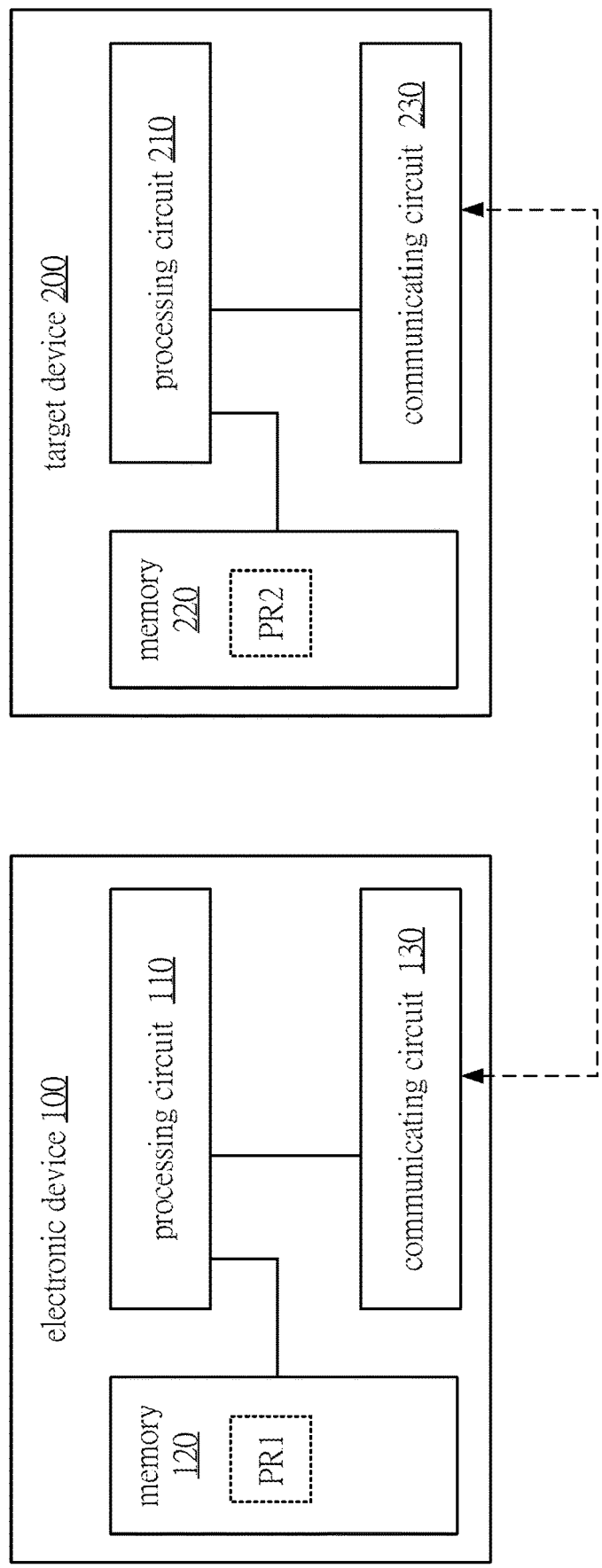
FIG. 1 is a schematic block diagram illustrating a communication scenario between an electronic device and a target device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is made to FIG. 1. FIG. 1 is a schematic block diagram illustrating a communication scenario between an electronic device 100 and a target device 200 in accordance with some embodiments of the present disclosure. The electronic device 100 may be configured to perform a frequency hopping communication to the target device 200 in order to transmit data or execute corresponding control commands between the electronic device 100 and the target device 200.

Specifically, in some embodiments, the electronic device 100 may be configured as the master, and the target device 200 may be configured as the slave. In some other embodiments, the electronic device 100 may be configured as the slave, and the target device 200 may be configured as the master, but the present disclosure is not limited thereto.

For example, the electronic device 100 and the target device 200 may be respectively realized by, a smartphone device, a tablet, a desktop computer or a notebook computer, a camera device, a standalone head mounted device (HMD) or VIVE HMD, or any other portable electronic devices having wireless communication ability, such as Bluetooth, IEEE 802.11, IEEE 802.11a/b/g, HomeRF, etc. In detail, the standalone HMD may handle such as processing location data of position and rotation, graph processing or others data calculation.

As shown in FIG. 1, the electronic device 100 and the target device 200 respectively includes processing circuits 110, 210, memories 120, 220, and communicating circuits 130, 230. One or more programs PR1 and PR2 are respectively stored in the memories 120, 220 and configured to be executed by the processing circuits 110, 210, in order to execute and control the frequency hopping communication between the electronic device 100 and the target device 200, via one or more frequency hopping systems such as IEEE 802.11 FH, Bluetooth, HomeRF 2.0, and/or other suitable frequency hopping systems. By applying frequency hopping communication, a set of workable frequency channels are provided to avoid interference to other devices in the wireless carrier. In addition, the one or more programs PR1 and PR2 are configured to be executed by the processing circuits 110, 210, in order to execute a frequency hopping communication recovering method, in which operations of the frequency hopping communication recovering method will be discussed in following paragraphs.

In some embodiments, the processing circuits 110, 210 can be realized by, for example, one or more processors, such as central processors and/or microprocessors, but are not limited in this regard. In some embodiments, the memories 120, 220 respectively include one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

In structural, the memories 120, 220 are respectively electrically connected to the processing circuits 110, 210. The communicating circuits 130, 230 are respectively electrically connected to the processing circuits 110, 210 and configured to communicate the electronic device 100 with the target device 200 via the frequency hopping communication by co-operation. In some embodiments, the communicating circuits 130, 230 include one or more radio frequency module (RF module) complying with a defined protocol for RF communications, such as Bluetooth, and used to transmit and/or receive radio signals between two devices. For example, the communicating circuits 130, 230 may incorporate a printed circuit board, one or more transmit or receive circuits, one or more antenna units, and serial interface for communication to the processing circuits 110, 210. One skilled in the art can understand how to implement the communicating circuits 130, 230, and thus further explanations are omitted herein for the sake of brevity.

In some embodiments, the bidirectional link between the electronic device 100 and the target device 200 may use polling mode to synchronize connection station between transmitter and receiver. Alternatively stated, in a same timeslot, an identical frequency is synchronized and applied at the electronic device 100 and at the target device 200.

However, connection between the electronic device 100 and the target device 200 sometimes encounters lost data due to RF latency, system jitter or environment interference, which causes frequencies at the two sides (i.e., the electronic device 100 and the target device 200) are not the same.

Under such circumstance, a frequency hopping communication recovering method may be performed by the electronic device 100 and the target device 200 to quickly catch an available frequency channel and recover the communication from sync loss.

Figure 2:
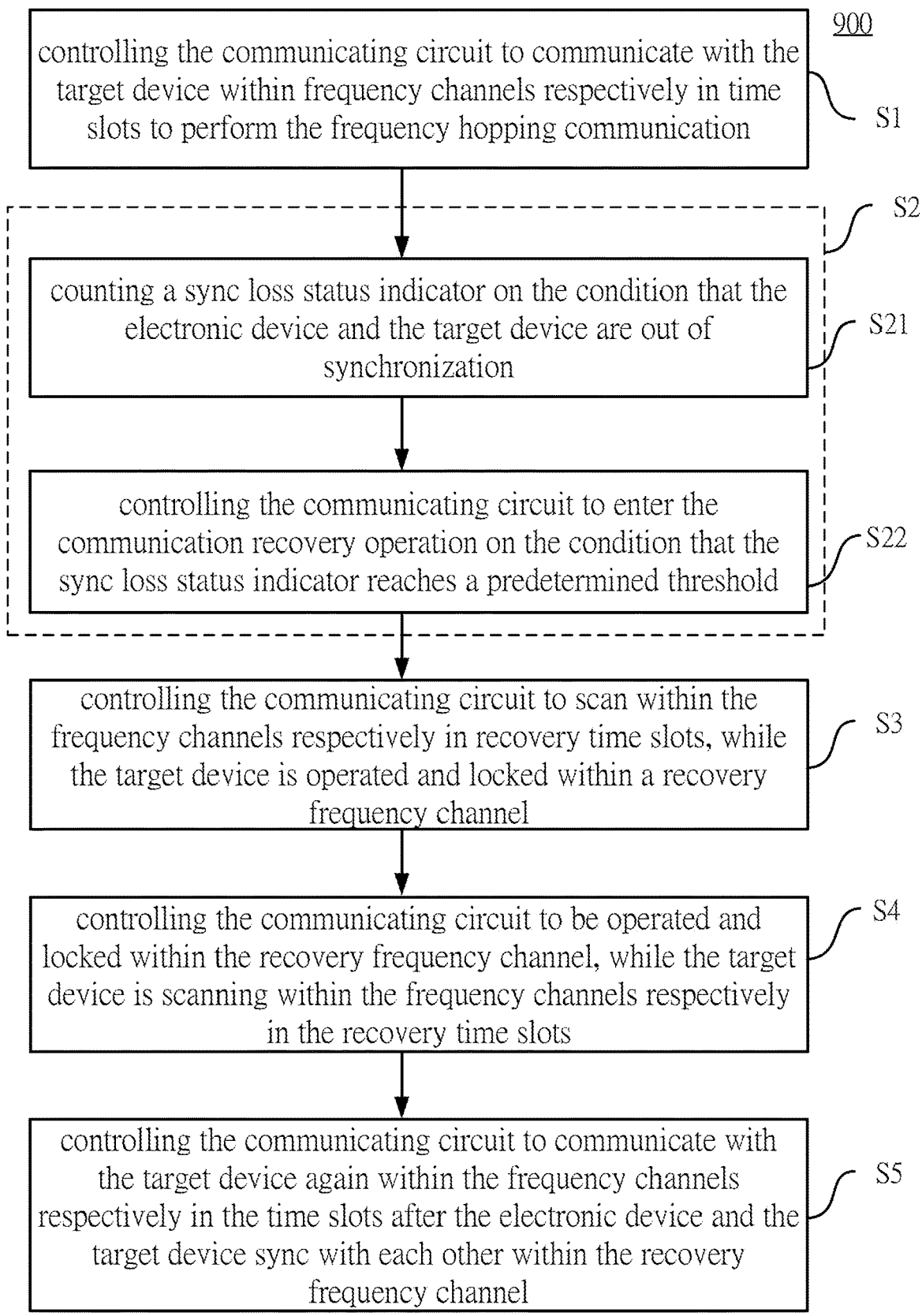
FIG. 2 is a flowchart illustrating the frequency hopping communication recovering method in accordance with some embodiments of the present disclosure.
Figure 3:
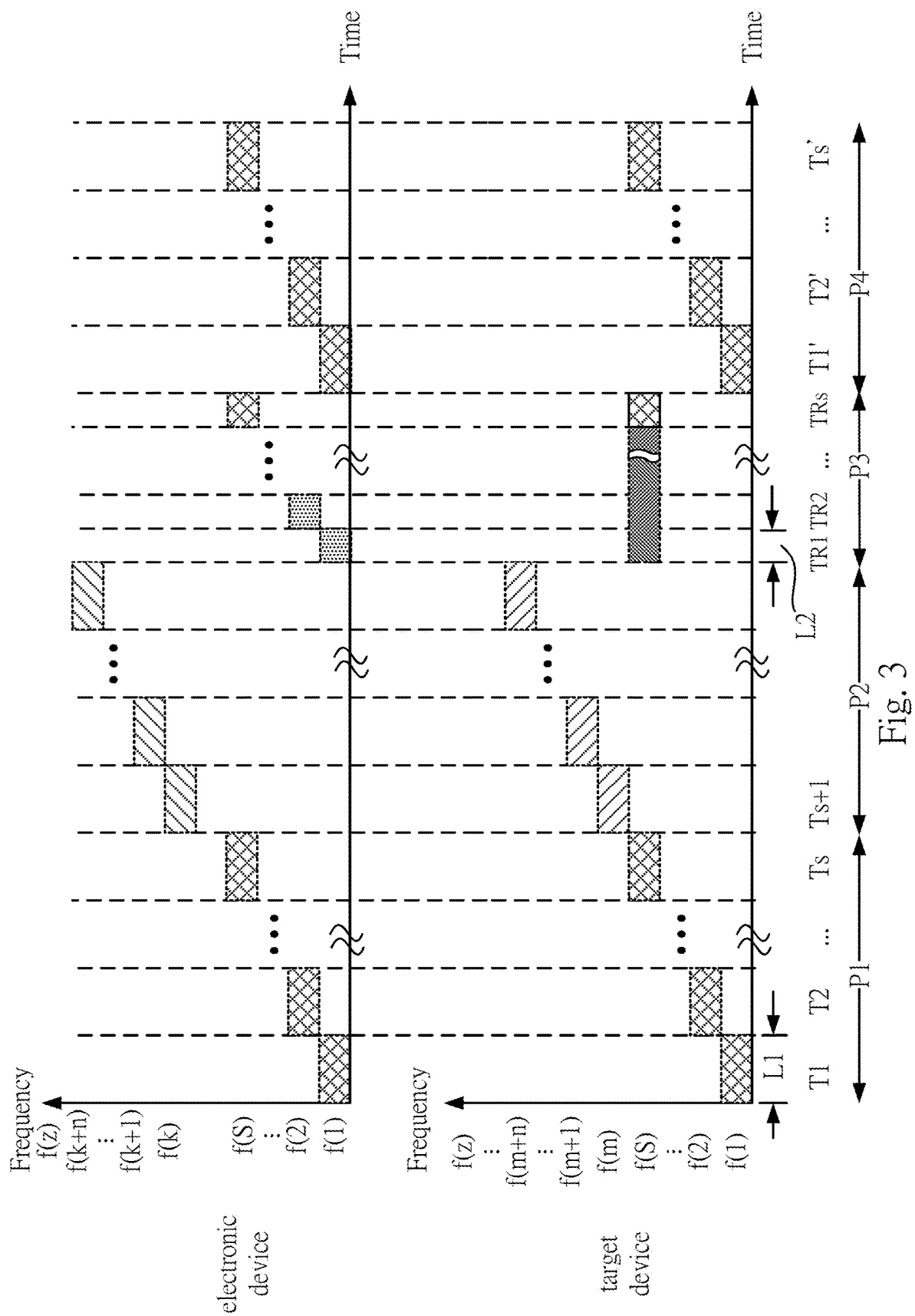
FIG. 3 is a diagram illustrating the relationship between the frequency channels and the time slots during the operations of the frequency hopping communication recovering method in accordance with some embodiments of the present disclosure.

The detailed operation of the electronic device 100 and the target device 200 will be discussed in accompanying with the embodiments shown in FIG. 2. FIG. 2 is a flowchart illustrating the frequency hopping communication recovering method 900 in accordance with some embodiments of the present disclosure. It should be noted that the frequency hopping communication recovering method 900 can be applied to an electrical device having a structure that is the same as or similar to the structure of the electronic device 100 and/or the target device 200 shown in FIG. 1. To simplify the description below, the embodiments shown in FIG. 1 will be used as an example to describe the frequency hopping communication recovering method 900 according to some embodiments of the present disclosure. However, the present disclosure is not limited to application to the embodiments shown in FIG. 1. Furthermore, for better understanding of the present disclosure, reference is made to FIG. 3 together. FIG. 3 is a diagram illustrating the relationship between the frequency channels and the time slots during the operations of the frequency hopping communication recovering method 900 according to some embodiments of the present disclosure.

As shown in FIG. 2, the frequency hopping communication recovering method 900 includes operations S1, S2, S3, S4, and S5. In operation S1, the processing circuit 110 is configured to control the communicating circuit 130 to communicate with the target device 200 within multiple frequency channels respectively in different time slots T1-Ts to perform the frequency hopping communication. As shown in FIG. 3, candidate frequency channels f(1)~f(z) are possible frequencies used in both the electronic device 100 and the target device 200 for the frequency hopping communication. The time slots T1-Ts have the length L1 accordingly. As shown in FIG. 3, in the period P1, the frequency of the electronic device 100 and the target device 200 are identical in the same timeslot, in which the frequency used for communication switches during radio transmission in different time slots T1-Ts in order to reduce unintentional interference and avoid interception. That is, the electronic device 100 and the target device 200 are synchronized. Specifically, as the embodiments shown in FIG. 3, the communicating circuit 130 and the target device 200 are synced at the frequency channel f(1) in the time slot T1, synced at the frequency channel f(2) in the time slot T2, and so on. In the time slot Ts, the communicating circuit 130 and the target device 200 are synced at the frequency channel f(S).

In operation S2, the processing circuit 110 is configured to determine whether a communication recovery operation in entered in response to a synchronization lost event occurred between the electronic device 100 and the target device 200.

Specifically, in some embodiments, the operation S2 includes operations S21 and S22. In operation S21, the processing circuit 110 is configured to count a sync loss status indicator on the condition that the electronic device 100 and the target device 200 are out of synchronization. For example, the sync loss status indicator may include a drop data fail rate, a retransmit count, a hopping count, or any combination thereof.

Then, in operation S22, the processing circuit 110 may control the communicating circuit 130 to enter the communication recovery operation on the condition that the sync loss status indicator reaches a predetermined threshold. Similarly, for the target device 200, the processing circuit 210 may perform corresponding operation and control the communicating circuit 230 to enter the communication recovery operation during the operations S21 and S22.

As shown in FIG. 3, the synchronization lost event occurred when entering the period P2. The frequency channel of the electronic device 100 and the target device 200 are not the same due to RF latency, system jitter or various environment interferences, such that the communication between devices is failed. For example, at the time slot Ts+1, the frequency of the electronic device 100 is configured as f(k), while the frequency of the target device 200 is configured as f(m). Under such condition, the processing circuit 110 may count the hopping time as the sync loss status indicator and determine whether a threshold value is reached. As shown in FIG. 3, if the devices do not recover back to sync within N time slot, the processing circuit 110 controls the communicating circuit 130 to enter the communication recovery operation.

As shown in FIG. 3, during the period P3, the communication recovery operation is entered and operations S3 and S4 are performed. As shown in the drawing, in some embodiments, during the recovery process, the target device 200 may be configured to be operated and locked within a recovery frequency channel in the candidate frequency channels f(1)~f(z) by the processing circuit 210 correspondingly. In such condition, the operation S3 is executed.

In the operation S3, the processing circuit 110 is configured to control the communicating circuit 130 to scan within the candidate frequency channels f(1)~f(z) respectively in the recovery time slots TR1-TRs while the target device 200 is operated and locked within the recovery frequency channel in the candidate frequency channels f(1)~f(z). For example, in some embodiments, the recovery frequency channel may be chosen from the frequency channels f(1)~f(S) of the candidate frequency channels f(1)~f(z). The frequency channels f(1)~f(S) are the channels able to sync the electronic device 100 and the target device 200 in the normal frequency hopping operation period P1. As shown in drawing, in some embodiments, the recovery frequency channel may be configured as the frequency channel f(S) corresponding to a latest one (i.e., time slot Ts) of the time slots T1-Ts able to sync the electronic device 100 and the target device 200. Alternatively stated, the frequency channel f(S) may be the last sync frequency.

In some other embodiments, the recovery frequency channel may also be configured as another frequency channel differs from the frequency channel f(S). The recovery frequency channel may be chosen from the frequency channels f(1)-f(S) able to sync the electronic device 100 and the target device 200 in the period P1. In some other embodiments, the recovery frequency channel may be chosen from a predetermined numbers of the frequency channels f(S−i)-f(S) counted backward from the frequency channel where the devices loss sync at the time slot Ts+1, in which i is any integer. Those recovery frequency channel candidates may be valued based on various parameters. For example, the processing circuit 110 may configure the recovery frequency channel according to a received signal strength indicator (RSSI), a signal to noise ratio (SNR), a fail rate, or combinations thereof of the frequency channels f(1)-f(S) able to sync the electronic device 100 and the target device 200 in the period P1, or the selected candidate frequency channels f(S−i)-f(S). For instance, the recovery frequency channel may be configured as the frequency channel in the selected candidate frequency channels with a highest signal to noise ratio, a highest received signal strength indicator (RSSI), and/or the frequency channel with a lowest fail rate. The processing circuit 110 may also calculate a rating value to evaluate the connection ability based on the received signal strength indicator (RSSI), the signal to noise ratio (SNR), the fail rate, and/or other parameters to determine which of the candidate frequency channels will be used as the recovery frequency channel.

Since the frequency of the target device 200 remain unchanged while the electronic device 100 performs frequency scanning, the electronic device 100 and the target device 200 may communicate with each other again after two devices sync within the recovery frequency channel. Thus, the recovery process is successfully completed.

It is noted that, in some embodiments, the recovery time slots TR1-TRs have the length L2 shorter than the length L1. Thus, the electronic device 100 may scan through the possible frequencies of the target device 200 more quickly and more efficiently during the recovery process, since the frequency of the electronic device 100 switches between the candidate frequencies with shorter time periods.

Figure 4:
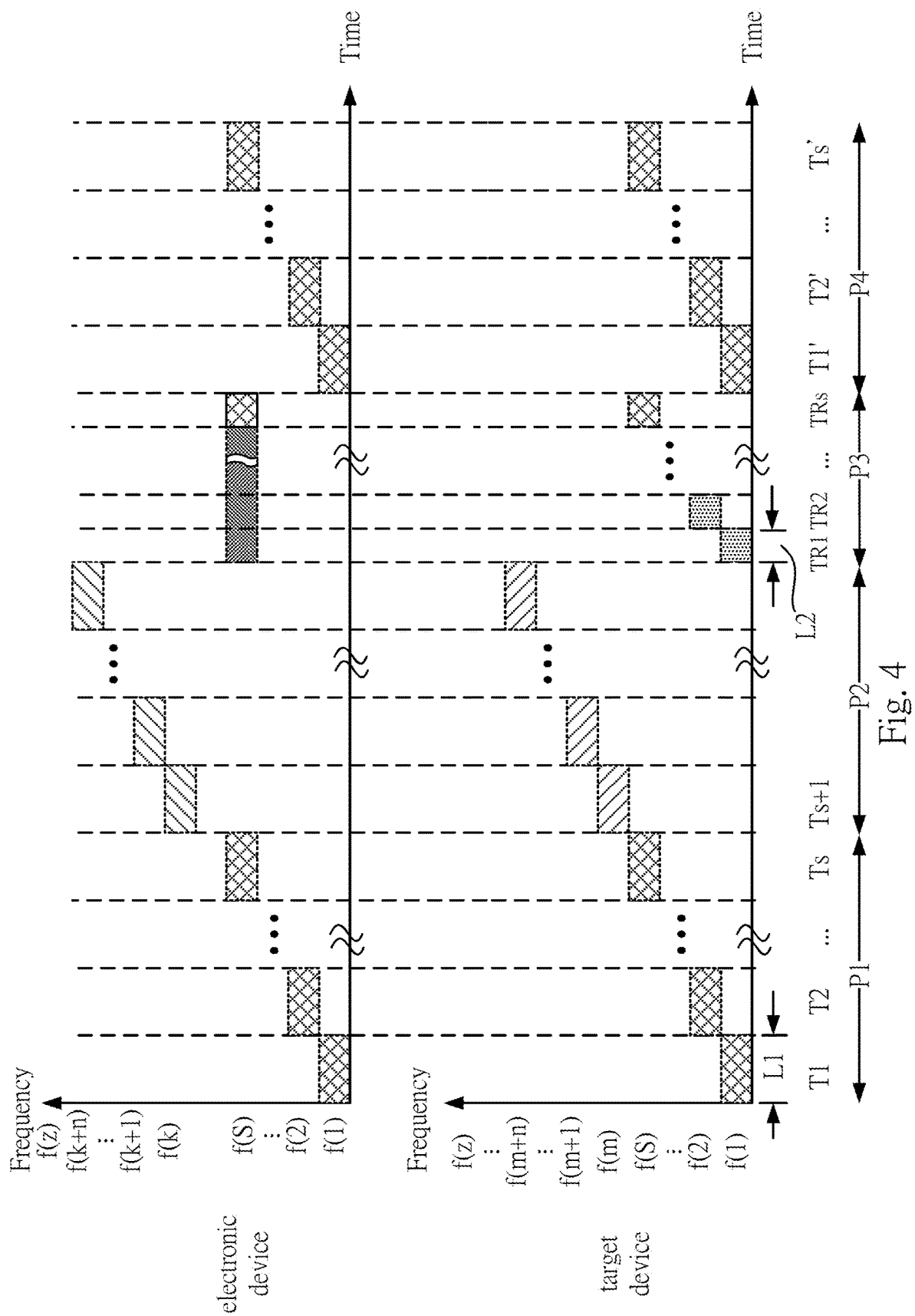
FIG. 4 is a diagram illustrating the relationship between the frequency channels and the time slots during the operations of the frequency hopping communication recovering method in accordance with some other embodiments of the present disclosure.

Reference is made to FIG. 4 together. FIG. 4 is a diagram illustrating the relationship between the frequency channels and the time slots during the operations of the frequency hopping communication recovering method 900 according to some other embodiments of the present disclosure.

As shown in FIG. 4, in some other embodiments, during the recovery process, the target device 200 may also be configured to scan within the candidate frequency channels f(1)~f(z). For example, the target device 200 may scan within the frequency channels f(1)~f(S) respectively in the recovery time slots TR1~TRs by the processing circuit 210. In such condition, the operation S4 is executed.

In the operation S4, the processing circuit 110 is configured to control the communicating circuit 130 to be operated and locked within the recovery frequency channel while the target device 200 is scanning within the candidate frequency channels f(1)~f(z). For example, the target device 200 may scan within the frequency channels f(1)~f(S) respectively in the recovery time slots TR1~TRs. Similarly, in some embodiments, the recovery time slots TR1~TRs for the target device 200 to scan within the frequency channels f(1)~f(S) have the length L2 shorter than the length L1.

Alternatively stated, according to various embodiments, in the communication recovery operation period P3, one of the electronic device 100 and the target device 200 is configured to be operated and locked within the recovery frequency channel, while another one is configured to scan within the candidate frequency channels f(1)~f(z) respectively in the recovery time slots TR1~TRs having shorter lengths compared to the time slots T1~Ts in the normal frequency hopping operation period P1.

After the communication recovery operation period P3, in a re-synced period P4, the operation S5 is executed. In the operation S5, the processing circuit 110 is configured to control the communicating circuit 130 to communicate with the target device 200 again within the candidate frequency channels f(1)~f(z), such as the frequency channels f(1)~f(S) respectively in the time slots T1'~Ts' having the length L1 after the electronic device 100 and the target device 200 sync with each other within the recovery frequency channel. As shown in FIG. 3 and FIG. 4, in the re-synced period P4, the electronic device 100 and the target device 200 are again synchronized, and the frequency switches during radio transmission to reduce unintentional interference and avoid interception.

Furthermore, in some embodiments, in the operation S5, the processing circuit 110 is further configured to control the communicating circuit 130 to remove one or more candidate frequency channels f(1)~f(z) unable to sync the target device 200 from the frequency channels used to perform the frequency hopping communication. Since the lost sync event sometimes occurred due to greater interference at one or more specific frequencies, the electronic device 100 and the target device 200 may communicate with each other to simultaneously eliminate one or more unsuccessful frequency channels from the frequency channels used to perform the frequency hopping communication. For example, the frequencies with lower signal amplitude or lower signal-to-noise ratio may be removed from the candidates, to prevent the lost sync event.

The aforementioned recovering operations may be performed repeatedly, attempting to sync the electronic device 100 and the target device 200 again until time out. In some embodiments, if the preset timeout threshold is reached, a disconnection operation is performed to disconnect the electronic device 100 and the target device 200.

Figure 5:
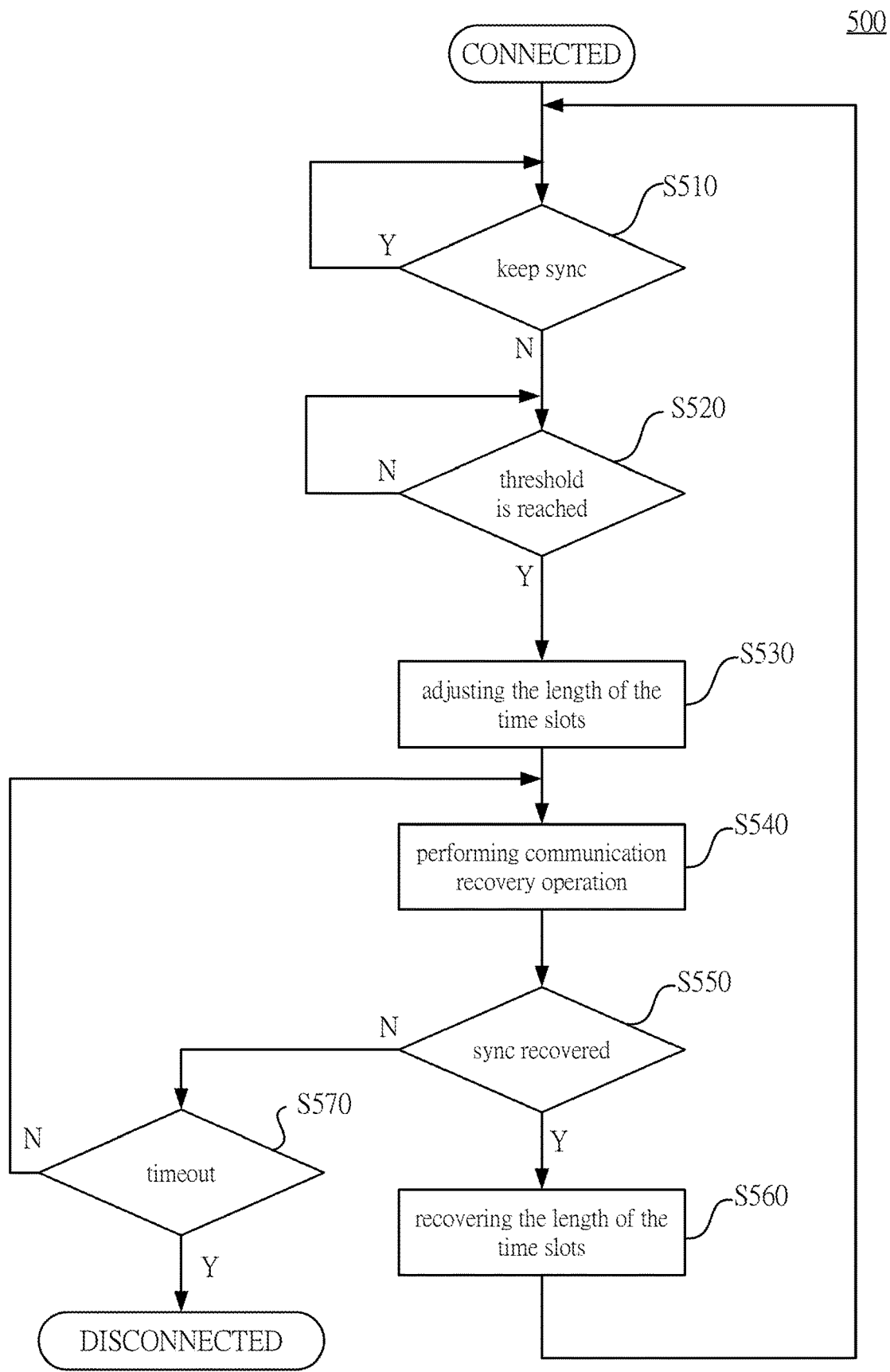
FIG. 5 is a flowchart illustrating steps of the frequency hopping communication recovering method in accordance with some embodiments of the present disclosure.

Reference is made to FIG. 5. FIG. 5 is a flowchart 500 illustrating steps of the frequency hopping communication recovering method 900 in accordance with some embodiments of the present disclosure. As shown in FIG. 5, in step S510, the processing circuit 110 is configured to monitor whether the devices are in sync, until the sync lost event occurs. If the devices lost sync, step S520 is performed, and the processing circuit 110 is configured to determine whether the predetermined threshold is reached based on the sync loss status indicator.

If the predetermined threshold is reached, step S530 is performed, and the processing circuit 110 is configured to adjust and shorten the length of the recovery time slots to scan the frequencies in the recovery period. Then, in step S540, the communication recovery operation is performed. In step S550, the processing circuit 110 is configured to monitor whether the devices are recovered in sync.

If the devices are recovered in sync, step S560 is performed and the processing circuit 110 is configured to recover the length of the time slots back to the normal length to perform the frequency hopping. If not, step S570 is performed and the processing circuit 110 is configured to repeat the steps S540-S570 before the time out. If the connection time out, the electronic device 100 and the target device 200 will be disconnected accordingly.

Those skilled in the art can immediately understand how to perform the steps in the flowchart 500 to implement the frequency hopping communication recovering method 900 in the various embodiments described above, and thus a further explanation is omitted herein for the sake of brevity.

It is noted that the above embodiments are simplified for better understanding of the present disclosure. It should be noted that, in some embodiments, the frequency hopping communication recovering method 900 may be implemented as a computer program. When the computer program is executed by a computer, an electronic device, or the processing circuit 110 in FIG. 1, this executing device performs the frequency hopping communication recovering method 900. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned frequency hopping communication recovering method 900, no particular sequence is required unless otherwise specified. Moreover, the operations may also be performed simultaneously or the execution times thereof may at least partially overlap.

Furthermore, the operations of the frequency hopping communication recovering method 900 may be added to, replaced, and/or eliminated as appropriate, in accordance with various embodiments of the present disclosure.

Through the operations of various embodiments described above, a frequency hopping communication recovering method is implemented to realize the recovering of the connection when the frequency hopping communication system faces the lost sync event, which reduces the waiting time and the waste of the spectrum resources and brings a smoother user experience.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically include transistors or other circuit elements that are configured in such a way as to control the operation of the circuity in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the scope of the appended claims should not be limited to the description of the embodiments contained herein.

What is claimed is:

1. An electronic device, comprising:
   a processing circuit;
   a communicating circuit electrically connected to the processing circuit and configured to communicate the electronic device with a target device via a frequency hopping communication;
   a memory electrically connected to the processing circuit; and
   one or more programs, wherein the one or more programs are stored in the memory and configured to be executed by the processing circuit, the one or more programs comprising instructions for:
      controlling the communicating circuit to communicate with the target device within a plurality of frequency channels respectively in a plurality of time slots to perform the frequency hopping communication;
      in a communication recovery operation, controlling the communicating circuit to scan within the plurality of frequency channels respectively in a plurality of recovery time slots, while the target device is operated and locked within a recovery frequency channel in the plurality of frequency channels; and
      in the communication recovery operation, controlling the communicating circuit to be operated and locked within the recovery frequency channel, while the target device is scanning within the plurality of frequency channels respectively in the plurality of recovery time slots, wherein the plurality of time slots have a first length, and the plurality of recovery time slots have a second length shorter than the first length;
   wherein the recovery frequency channel is configured according to at least two of a received signal strength indicator, a signal to noise ratio and a fail rate of one or more of the frequency channels able to sync the electronic device and the target device.

2. The electronic device as claimed in claim 1, wherein the one or more programs further comprise instructions for:
   counting a sync loss status indicator on the condition that the electronic device and the target device are out of synchronization; and
   controlling the communicating circuit to enter the communication recovery operation on the condition that the sync loss status indicator reaches a predetermined threshold.

3. The electronic device as claimed in claim 2, wherein the sync loss status indicator comprises a drop data fail rate, a retransmit count, a hopping count, or any combination thereof.

4. The electronic device as claimed in claim 1, wherein the one or more programs further comprise instructions for:
   controlling the communicating circuit to communicate with the target device again within the plurality of frequency channels respectively in the plurality of time slots having the first length after the electronic device and the target device sync with each other within the recovery frequency channel.

5. The electronic device as claimed in claim 4, wherein the one or more programs further comprise instructions for:
   controlling the communicating circuit to remove one or more frequency channels unable to sync the target device from the plurality of frequency channels used to perform the frequency hopping communication.

6. The electronic device as claimed in claim 1, wherein the recovery frequency channel is configured as one of the frequency channels corresponding to a latest one of the plurality of time slots able to sync the electronic device and the target device.

7. A non-transitory computer readable storage medium storing one or more programs, comprising instructions, which when executed, causes a processing circuit to perform operations comprising:
   controlling a communicating circuit to communicate an electronic device with a target device within a plurality of frequency channels respectively in a plurality of time slots to perform a frequency hopping communication;
   in a communication recovery operation, controlling the communicating circuit to scan within the plurality of frequency channels respectively in a plurality of recovery time slots, while the target device is operated and locked within a recovery frequency channel in the plurality of frequency channels; and
   in the communication recovery operation, controlling the communicating circuit to be operated and locked within the recovery frequency channel, while the target device is scanning within the plurality of frequency channels respectively in the plurality of recovery time slots, wherein the plurality of time slots have a first length, and the plurality of recovery time slots have a second length shorter than the first length;

wherein the recovery frequency channel is configured according to at least two of a received signal strength indicator, a signal to noise ratio and a fail rate of one or more of the frequency channels able to sync the electronic device and the target device.

8. The non-transitory computer readable storage medium as claimed in claim 7, further comprising instructions, which when executed, causes the processing circuit to further perform operations comprising:

counting a sync loss status indicator on the condition that the electronic device and the target device are out of synchronization; and controlling the communicating circuit to enter the communication recovery operation on the condition that the sync loss status indicator reaches a predetermined threshold.

9. The non-transitory computer readable storage medium as claimed in claim 7, wherein the sync loss status indicator comprises a drop data fail rate, a retransmit count, a hopping count, or any combination thereof.

10. The non-transitory computer readable storage medium as claimed in claim 7, further comprising instructions, which when executed, causes the processing circuit to further perform operations comprising:

controlling the communicating circuit to communicate with the target device again within the plurality of frequency channels respectively in the plurality of time slots having the first length after the electronic device and the target device sync with each other within the recovery frequency channel.

11. The non-transitory computer readable storage medium as claimed in claim 10, further comprising instructions, which when executed, causes the processing circuit to further perform operations comprising:

controlling the communicating circuit to remove one or more frequency channels unable to sync the target device from the plurality of frequency channels used to perform the frequency hopping communication.

* * * * *